No. 16,574. PATENTED FEB. 10, 1857.
J. C. BRIGGS.
MELODEON.
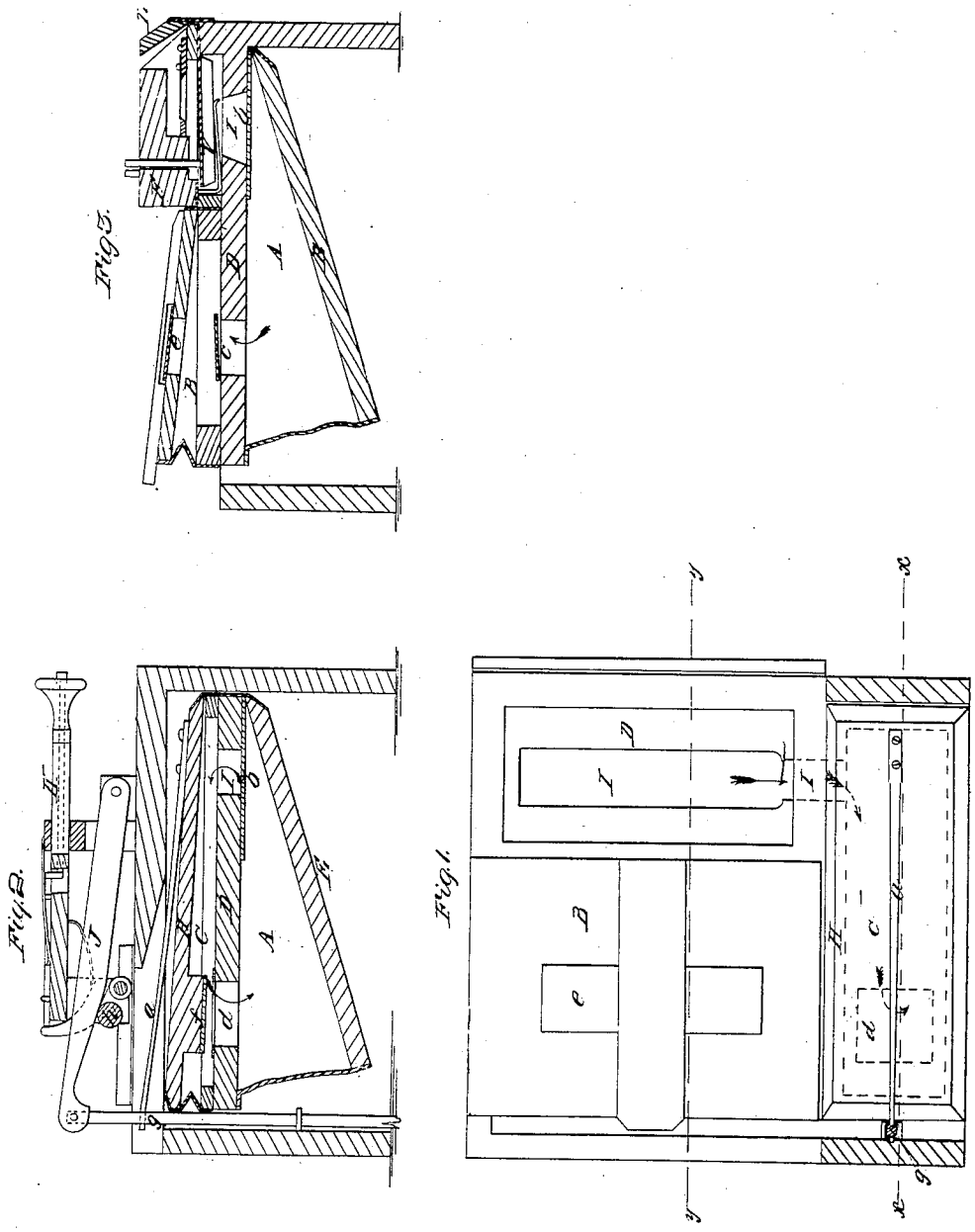

UNITED STATES PATENT OFFICE.

J. C. BRIGGS, OF WOODBURY, CONNECTICUT.

MELODEON.

Specification of Letters Patent No. 16,574, dated February 10, 1857.

*To all whom it may concern:*

Be it known that I, J. C. BRIGGS, of Woodbury, in the county of Litchfield and State of Connecticut, have invented a new and useful Improvement in Melodeons and other Wind Instruments of Similar Character; and I do hereby declare that the following is a full, clear, and exact description of the same, reference being had to the accompanying drawings, forming part of this specification.

This invention consists in what is hereinafter termed an expression chamber arranged between the valves and the wind-reservoir of a melodeon or other instrument of a similar character and operating as hereinafter described to control the passage of the air to or from the wind reservoir in such a manner as to give any expression to the instrument, to produce the softest tone that is perceptible to the ear or the fullest tone that the instrument is capable of producing.

Figure 1, in the drawing, is a plan view showing the arrangement of the expression chamber, the pump and the wind passage leading from the valves of a melodeon having an exhausting or suction bellows, the reed board and valves being removed to show the passage. Fig. 2, is a vertical section of the wind reservoir and expression chamber in the plane indicated by the line $x$, $x$, in Fig. 1. Fig. 3, is a vertical section of the pump, the wind reservoir, the valves, the reeds and the passage leading from the reeds and valves to the expression chamber, in the plane indicated by the line $y$, $y$, in Fig. 1.

Similar letters of reference indicate corresponding parts in the several views.

A, is the wind reservoir; B is the pump, and C the expression chamber. The wind reservoir A, is constructed in the same manner as the wind reservoir of many other melodeons, the top part of it consisting of a stationary board D, and the bottom, of a vibrating board E, and it occupies as nearly as possible the whole horizontal area of the case of the instrument. The pump B, is arranged over the back part of the wind reservoir, behind the reed board F, but it does not extend the whole length of the wind receiver, being made shorter to make room for the expression chamber C, which is arranged at one end of the instrument over the wind reservoir. This chamber is made to expand and contract after the fashion of a bellows. Its bottom is formed by a portion of the stationary board D which constitutes both the top of the wind reservoir and the bottom of the pump. Its top H, is movable and has applied to it, externally, a spring $a$, which always exerts some tendency to raise it and thus expand the chamber. The passage I, under the reed board F, and valves V, see Figs. 1 and 3, consisting of a slit in the board D, which generally communicates directly with the wind reservoir, is closed at the bottom as shown at $b$, Fig. 3, and instead of communicating with the wind reservoir, is made to communicate at one end with the expression chamber, as shown in Figs. 1 and 2. The closing of the passage I, at the bottom is effected by gluing a piece of india-rubber-coated canvas across it, as I find this to give a better tone than when wood is used. The expression chamber has a port $d$, in its bottom D, communicating with the wind reservoir A, and the wind reservoir communicates with the pump B by a valve $c$, of the usual kind. The pump has a discharge valve $e$, of the usual kind at the top. The top board H, of the expression chamber has attached to it, a valve $f$, see Fig. 2, which hangs above the opening $d$, and which, when the board is down and the chamber contracted to its smallest capacity, covers the port $d$, so closely as almost entirely to prevent the passage of any wind through the said opening.

When the pump is set in operation and the wind reservoir exhausted, the expression chamber is exhausted also through the port $d$. The effect of the exhaustion of the expression chamber is a tendency to collapse, that is to say, to cause the board A, to descend, by which means the valve $f$, is made to contract the opening of the port $d$ and thereby reduce the admission of wind through the reeds, thus giving a soft expression to the instrument. The above tendency is greater or less according as the force of the spring $a$, tending to raise the board H, is less or greater, and therefore by regulating or varying the force of the spring, the expression may be regulated or varied at the pleasure of the player. The force of the spring may be graduated by a foot pedal or by a slide acting like a stop or by any other suitable means, but I have represented methods of governing it both by a pedal and slide. The spring $a$, consists of a bar of steel or other metal secured at one end of the top board A, of the expression chamber and having the other end connected with a rod $g$, as shown in Figs. 1 and 2. By raising the rod $g$, the tendency of the spring to raise the board A is increased and by lowering it, the said tendency is diminished. By connecting this rod $g$, with a pedal the force of the spring may be graduated to give any desired expression or change of expression while playing. By connecting the said rod $g$, with a lever J, and applying the stop like slide K, with a roller $h$, to act under the lever to raise or lower it by pulling out or pushing in the stop, the force of the spring may be regulated to any degree of expression, but the stop does not admit of such convenience for varying the expression while playing, as the pedal. The spring $a$, should be so strong that when adjusted to exert its greatest force it will not allow the expression chamber to collapse sufficiently to contract the opening of the port $d$, when the loudest expression is required, but its adjustment should be such that it may be caused to exert a scarcely perceptible influence on the expression chamber, when the softest expression is required.

The expression chamber is not intended to be used as a substitute for the swell commonly used which may be applied in the usual manner, as represented at L, Fig. 3. It may be used either with or without the swell L, or with the said swell opened or closed according to the degree of expression required.

Instead of attaching the valve $f$, rigidly to the top board A, of the expression chamber, it may be attached in the form of a flap to the bottom thereof and connected to the top board by a string which will allow it to rise or fall to enlarge or contract the opening of the port $d$, as the chamber is less or more collapsed.

If desired, an expression chamber may be used at each end of the instrument and the passage I, may be divided by a partition across it to connect one portion of the instrument with one expression chamber and the other portion with the other. By this means, a loud expression may be given to one portion and a soft expression to the other portion of the instrument.

The invention is applicable to an instrument having a forcing bellows, with the same advantage as to one having a suction bellows, and will be applied between the wind reservoir and reeds in a substantially similar manner, but the spring instead of being applied to expand the expression chamber, as when the suction bellows is used, will be applied in such a manner as to exert a tendency to collapse it and the valve $f$, will be arranged to open toward the reservoir, and though the operation of the wind on the chamber and upon the valve $f$, will be precisely the reverse of what it is in the instrument with the suction bellows the same result will be produced in both cases.

I do not claim to be the inventor of the swell, for melodeons; neither do I claim the use of an air reservoir, or expanding chamber for regulating or giving steadiness to the exhaust. A device of this kind may be seen, for one example, in the patent granted to A. L. Swan, 1852.

My improvement consists in the introduction of what I term an expression chamber, between the bellows and the regulating chamber. The office of my expression chamber is to facilitate the production of a swell without separating or changing the tone of such swell.

In the patent granted to E. Hamlin, 1856, an extra chamber of non elastic character is used, the arrangement being such that when the opening between said chamber and the wind reservoir is closed, the vibrations of the bellows will be distinctly and instantaneously felt upon the reeds, so that a swell will be produced, either high or low, according to the force applied by the foot to the bellows. It is obvious that by this arrangement it would be an utter impossibility to regulate the tone of any swell with exactitude or to produce two swells of the same tone, or to prevent the variation of quality in a tone, for there is a constant change by and between each stroke of the bellows. The same difficulty is seen in Swan's device and in all other melodeons with which I am acquainted; there is no method of separating or regulating or adjusting the tone of the swell, so that when the pressure of the wind is greater or less the quality of the sound will be accordingly changed.

Now, the object of my improvement is to prevent these difficulties and it will be seen that I fully reach that object. No matter how much the pressure of the wind changes, in my instrument the quality of its tone or pitch will not be altered. It can be set, at pleasure, to any desired pitch and there will be no change or variation therefrom no matter how variable the pressure of the bellows. These important characteristics have never been known in melodeons heretofore.

I distinctly disclaim everything in my device which is similar to Swan's invention, or to Hamlin's, before mentioned.

I do not confine myself to the particular means herein described, of graduating the force of the spring $a$, nor to the particular position of the expression chamber relatively to the exterior of the wind reservoir and pump. But

What I claim as my invention and desire to secure by Letters Patent, is—

The expression chamber C, with its valve $f$, arranged and operating in the manner and for the purposes substantially as herein described.

J. C. BRIGGS.

Witnesses:
J. F. BUCKLEY,
W. TUSCH.